Patented Oct. 21, 1941

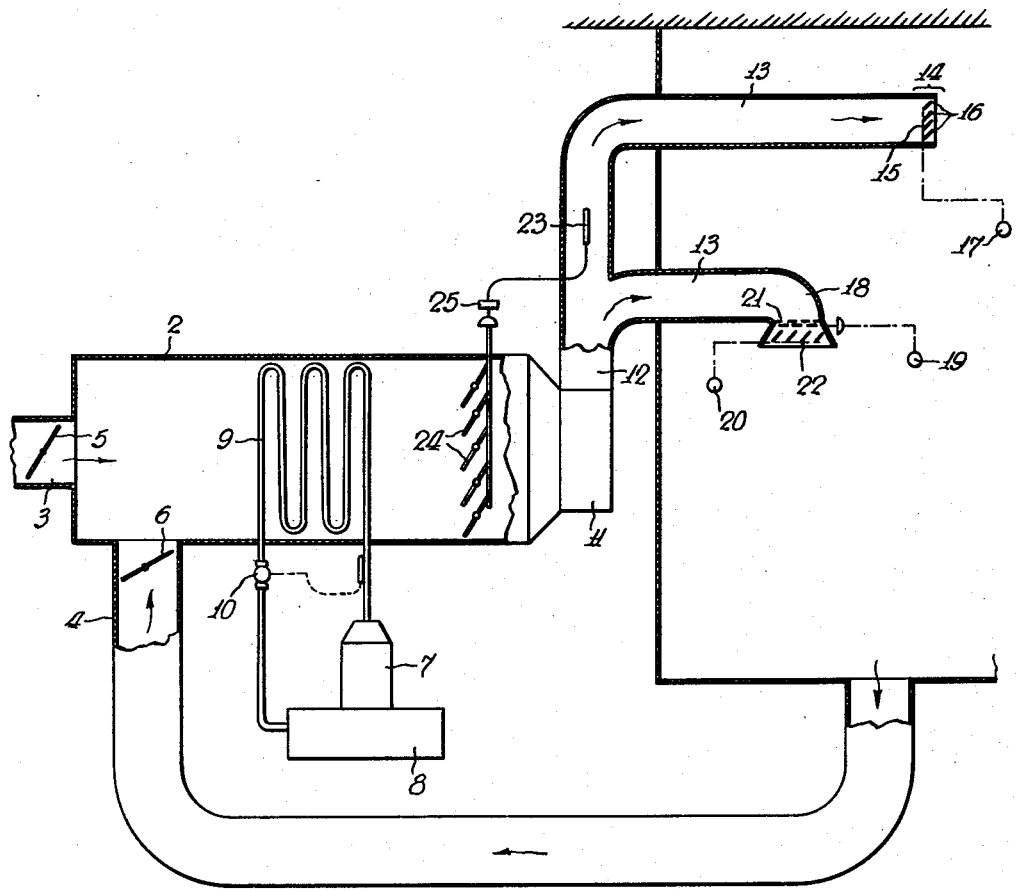

2,259,780

UNITED STATES PATENT OFFICE 2,259,780

AIR CONDITIONING APPARATUS

Herman Seid, Syracuse, N. Y., assignor to Auditorium Conditioning Corporation, Jersey City, N. J., a corporation of New Jersey Application November 23, 1938, Serial No. 241,912

1 Claim. (Cl. 98—33)

This invention relates to air conditioning systems designed for producing and maintaining desired temperatures and relative humidities in enclosures accommodating people.

The principal object of the invention is to provide an arrangement of automatic controls for regulating the volume and direction of discharge of air delivered to a conditioned enclosure in response to changes in atmospheric conditions therein.

A principal consideration in designing an air conditioning system for human comfort is to deliver air at a dry bulb temperature and with an absolute moisture content so controlled that the heat and moisture loads due to human occupancy, infiltration, transmission, and other factors, will be compensated for and a resultant temperature obtained at a desired relative humidity within tolerable limits. The introduction of conditioned air must be accomplished without the production of objectionable drafts even though the temperature of the conditioned air is often at a considerable differential from that of the maintained condition in the room. Various solutions of this problem have been provided in the art, all of which have disadvantages which mediate against universal use in all applications of air conditioning for human comfort. In the "bypass" systems conditioned air is augmented by a volume of return air and/or outdoor air but this often requires duct sizes which can not easily be accommodate in the spaces available. Similarly, ejector systems which permit introduction of air at comparatively great differentials from maintained conditions in the enclosure, as compared to the small differentials in "bypass" systems, also at times offer objections due to the necessity for comparatively high ceiling heights, if drafts are to be avoided. Also, in the case of high velocity discharge of conditioned air the problem of specially designed outlets and the use, at times, of comparatively large volumes, makes the problem difficult of solution.

The improved system provided by the present invention requires small areas for duct runs since the only air delivered is conditioned air. By use of variable volume discharge, different load conditions are readily taken care of. However, the change in volume, as when the quantity of air is increased, will not impair the requirements of comparatively draftless distribution in view of accurate synchronization of the direction in which the air is discharged in combination with control of the volume discharged as the direction is varied. Further, coordination between the volumes of air discharged at individual outlets and the volume supplied by a central fan serving all said outlets assures substantial elimination of noise which might otherwise result due to increased air discharge through any of said outlets.

Further features of the invention will be more apparent from the following description, to be read in connection with the drawing which diagrammatically illustrates an air conditioning system embodying the invention in a preferred form.

Referring now to the drawing, numeral 2 designates a conditioner having an outdoor air intake 3 and a return air intake 4 respectively equipped with dampers 5 and 6. The dampers may be manually controlled or regulated automatically so that any desired amount of outdoor air will be admitted depending upon ventilation requirements and excess air required for conditioning and distribution admitted through return air intake 4. The conditioner may be equipped with sprays, coils, preheaters, reheaters, eliminators, and other devices required for cooling and dehumidifying air, but for purposes of illustration, a compressor 7 is shown with a condenser 8 from which refrigerant is admitted to conditioning coil 9 under the control of expansion valve 10. The manner of admitting refrigerant and the manner of controlling the cooling and dehumidifying processes may be in accordance with known methods, so that the air leaving the conditioner may be at a desired dry bulb temperature and relative humidity. Fan 11 delivers the conditioned air to a main distributing duct 12 which feeds a plurality of branch ducts 13. Each duct has one or more outlets generally designated 14 equipped with volume and directional control devices. As shown in connection with devices 15, this comprises a series of louvres 16 whose position is varied responsive to changes in dry bulb temperature within area A into which the air is discharged from outlet 14. As the dry bulb temperature in enclosure A tends to fall, thermostat 17 will cause louvres 16 partially to close. As louvres 16 assume a position tending to diminish the volume of air discharged from the outlet, they will be thrown upwardly toward the ceiling level, as the illustration indicates, with the result that the directional discharge will be away from the zone of occupany. Conversely, when the dry bulb temperature tends to rise in area A, a greater volume of air will be discharged but in a direction toward the zone of occupancy. While this method of operation may be applicable in enclosures having certain ceiling heights and structural limitations, it is obvious that under other conditions, it may be more desirable to increase the volume of air with a directional flow away from the zone of occupancy and conversely, to decrease the volume of air when the directional flow is deflected to a greater degree toward the zone of occupancy. In every case, however, the discharge of air is regulated not only with respect to volume but also with respect to directional deflection, the variations in volume and directional effect being synchronized and varied responsive to changing atmospheric conditions in the enclosure served by the outlet.

In outlet 18 a variation of the method of control is employed wherein the volume of air discharged is varied responsive to a humidistat 19, whereas the direction of discharge is varied under control of dry bulb thermostat 20. In practice, under summer operating conditions, as the load in the enclosure served by the outlet tends to increase, humidistat 19 will cause a greater volume of air to be discharged through openings of damper device 21. Conversely, as the load decreases, less conditioned air will be discharged from the outlet. The device 21 may be a series of ports or intermeshing grills or other device for metering the quantity of air delivered from the outlet. The directional effect imparted to the discharged air is under control of the louvres 22 whose position is varied responsive to dry bulb thermostat 20. In this case, the louvres are so arranged that a shifting in position thereof for the purpose of varying direction of discharge will not appreciably affect the volume, unlike the case of louvres 16 which are arranged so closely and so sized and spaced that a change in their position affects the volume passing through them as well as the direction of discharge.

While the air discharged from outlet 18 is shown controlled as to volume in accordance with humidity changes and controlled as to direction of discharge according to temperature changes, it is submitted that both volume and directional control can be effected responsive to temperature changes alone, for example, if this is desired, whereupon both instruments would work together responsive to change in temperature in the area served by the outlet.

Static pressure regulator tip 23 is located at a point in the duct system reflecting the average static pressure therein and controls volume dampers 24 through regulator 25. Thus, as the total volume discharged from all outlets served by the conditioner is decreased, static pressure regulator 23 will respond and cause damper 24 to tend to close, whereupon the pressure of discharge through the outlets will remain the same even though one or more of the outlets may be closed in part or entirely.

By controlling the volume of conditioned air discharged within the enclosure or different areas thereof, the load conditions in said areas are substantially exactly compensated for. Consequently, desired conditions are maintained within such areas despite fluctuations in load conditions affecting them. By controlling the direction of discharge, maximum effectiveness of distribution may be achieved without the production of drafts. Thus, more air will be delivered to take care of an increased load, but when delivering such increased volume of air, its discharge will be diverted so as not to create discomfort which otherwise might result if such increased volume were circulated directly into an area to cause drafts or streaks in zones of occupancy. As a result, different volumes may be introduced in the same area, but by regulating the direction of discharge, such air may be delivered without causing discomfort at different times. In effect, this is the reverse of usual practice, where the same volume of air is circulated in a given area in order to produce constant conditions. In applicant's case, a different volume of air at any desired condition and at times at very appreciable differentials from conditions in the enclosure may be introduced and by controlled directional effect, achieve desired comfort conditions without objectionable air movement in the zones of occupancy.

Since certain changes in carrying out the above method of operation and in the constructions set forth, which embody the invention, may be made without departing from its scope, it is intended that all matter contained in the above description or shown in the accompanying drawing shall be interpreted as illustrative and not in a limiting sense.

I claim:

An air conditioning system including a conditioner, means for delivering air from the conditioner to a system of ducts, outlets for discharging air from said ducts, means for varying the quantity of air delivered by said outlets responsive to changes in humidity conditions, and means for varying the direction of discharge of air from said outlets responsive to changes in dry bulb temperature conditions whereby the air delivered from said outlets will be discharged at different times into different parts of the zone of occupancy of an enclosure served by said outlets, depending upon the degree of cooling required therein for human comfort.

HERMAN SEID.